(12) United States Patent
Kato et al.

(10) Patent No.: US 7,388,791 B2
(45) Date of Patent: Jun. 17, 2008

(54) SIGNAL INTERFACE

(75) Inventors: Yoshiharu Kato, Kasugai (JP);
Yoshihiro Takemae, Kasugai (JP);
Toshio Ogawa, Kawasaki (JP);
Tetsuhiko Endoh, Kawasaki (JP);
Yoshinori Okajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 57 days.

(21) Appl. No.: 11/583,130

(22) Filed: Oct. 19, 2006

(65) Prior Publication Data

US 2007/0091989 A1    Apr. 26, 2007

(30) Foreign Application Priority Data

Oct. 20, 2005  (JP) .............................. 2005-305622

(51) Int. Cl.
*G11C 7/10*     (2006.01)
(52) U.S. Cl. ........................ 365/189.01; 365/189.09; 365/191
(58) Field of Classification Search ........... 365/189.01, 365/189.08, 189.09, 191, 198, 226; 326/86; 370/328, 338; 375/220, 257, 295
See application file for complete search history.

(56) References Cited

U.S. PATENT DOCUMENTS

| 7,079,555 | B2 * | 7/2006 | Baydar et al. ............... 370/532 |
| 2005/0226312 | A1 * | 10/2005 | Koslar et al. ............... 375/142 |

FOREIGN PATENT DOCUMENTS

| JP | 2001-156621 A | 6/2001 |
| JP | 2002-152029 A | 5/2002 |

* cited by examiner

*Primary Examiner*—Gene N. Auduong
(74) *Attorney, Agent, or Firm*—Arent Fox LLP

(57) ABSTRACT

Plural transmitter units generate plural currents corresponding to plural logical values, respectively, and propagate the currents to a common signal line. The common signal line synthesizes the currents generated by the transmitter units, and propagates them to a receiver unit as a synthetic current. The receiver unit restores the logical values the transmitter units generated, in accordance with the synthetic current. The values of the currents the transmitter units generate in correspondence with the logical values each differ, so that the value of the synthetic current can be changed for every combination of logical values. Accordingly, the receiver unit can restore the logical values outputted from the respective transmitter units, based on the synthetic current. That is, employing the common signal line enables signals transmitted from the transmitter units to be simultaneously received. Consequently, the number of signal lines laid between the transmitter units and the receiver unit is reduced.

8 Claims, 17 Drawing Sheets

| TR1(ROM1) | | TR2(ROM2) | | RCV(MCNT) | | | | | | | | | |
|---|---|---|---|---|---|---|---|---|---|---|---|---|---|
| logic | iTR1 | logic | iTR2 | iSYN | DCS7 | DCS6 | DCS5 | DCS4 | DCS3 | DCS2 | DCS1 | EN1 | EN2 |
| H | 2i | H | 8i | 10i | H | H | H | H | H | H | H | H | H |
| L | i  | H | 8i | 9i  | L | H | H | H | H | H | H | H | H |
| H | 2i | L | 5i | 7i  | L | L | L | H | H | H | H | H | H |
| L | i  | L | 5i | 6i  | L | L | L | L | H | H | H | L | H |
| no-output | | H | 8i | 8i | L | L | H | H | H | H | H | L | H |
| no-output | | L | 5i | 5i | L | L | L | L | L | L | H | H | L |
| H | 2i | no-output | | 2i | L | L | L | L | L | L | L | H | L |
| L | i  | no-output | | i  | L | L | L | L | L | L | L | H | L |

Fig. 4

SIGNAL INTERFACE

CROSS REFERENCE TO RELATED APPLICATION

This application is based upon and claims the benefit of priority from Japanese Patent Application No. 2005-305622, filed on Oct. 20, 2005, the entire contents of which are incorporated herein by reference.

BACKGROUND OF THE INVENTION

1. Field of the Invention

The present invention relates to a signal interface wherein signals transmitted from a plurality of transmitter units are received by a receiver unit.

2. Description of the Related Art

As a technique which heightens the transfer rate of data from a transmitter unit to a receiver unit without increasing the number of data lines, there has been proposed one wherein the values of currents to be fed to the data lines are changed in accordance with multi-level data (in, for example, Japanese Unexamined Patent Application Publication No. 2001-156621 or No. 2002-152029).

Conventionally, in cases where signals were transferred from a plurality of transmitter units to one receiver unit, a signal line needed to be laid for each of the transmitter units, in which case the number of the signal lines became large. Besides, in cases where signals were transmitted by employing a common signal line, arbitration needed to be done to determine the use right of the signal line, to prevent conflict of the signals. Accordingly, a technique in which signals are simultaneously transferred by employing a common signal line has not been proposed yet.

SUMMARY OF THE INVENTION

An object of the present invention is to reduce the number of signal lines that are laid between a transmitter unit and a receiver unit.

Another object of the invention is to simultaneously receive signals transmitted from a plurality of transmitter units, at a receiver unit.

In one aspect of the invention, a plurality of transmitter units generate a plurality of currents corresponding to a plurality of logical values, respectively, and they propagate the currents to a common signal line. The common signal line synthesizes the currents generated by the transmitter units, and propagates them to a receiver unit as a synthetic current. The receiver unit restores the logical values generated by the transmitter units, in accordance with the synthetic current. The values of the currents which the transmitter units generate in accordance with the logical values are different from one another, so that the value of the synthetic current can be changed for every combination of the logical values. Accordingly, the receiver unit can restore the logical values outputted from the respective transmitter units, on the basis of the synthetic current. In other words, signals that are transmitted from the transmitter units can be simultaneously received by employing the common signal line. As a result, the number of signal lines that are laid between the transmitter units and the receiver unit can be reduced. Moreover, the transfer rate of the signals can be enhanced.

In a preferable example in one aspect of the invention, the receiver correction unit of the receiver unit generates a correction signal which indicates the differences between the values of the currents generated by the respective transmitter units in accordance with known logical values and the expected values of the currents corresponding to the known logical values. The transmitter correction unit of each of the transmitter units corrects the current to-be-generated in accordance with the correction signal from the receiver unit, in order to bring the value of the current to-be-generated into agreement with the expected value. The transmitter unit can generate the optimum current in accordance with the reception situation of the receiver unit. Accordingly, the receiver unit can be prevented from restoring any erroneous logical value.

In a preferable example in one aspect of the invention, the output unit of the receiver unit simultaneously outputs the logical values restored in accordance with the respective transmitter units, to output lines independent of one another. Since the plurality of signals simultaneously received can be outputted in parallel, the next reception operation in the receiver unit can be started earlier, and the reception rate of the signals can be enhanced.

In a preferable example in one aspect of the invention, the arbiter of the receiver unit decides the output sequence of the logical values restored in accordance with the respective transmitter units, and it outputs the logical values to a common output line in the decided sequence. Because a common output line is formed, the wiring region of the output line can be reduced, and the system cost can be curtailed.

In a preferable example in one aspect of the invention, the transmitter units are respectively formed within semiconductor memories, and they generate the currents corresponding to the logical values of data signals read out from the memory cells of the semiconductor memories. The receiver unit is formed within a controller which controls accesses to the semiconductor memories in order to receive the data signals. Since the read data line (the common signal line) can be used in common by the plurality of semiconductor memories, the number of read data lines can be reduced. In general, data lines in semiconductor memories are larger in number than other sorts of signal lines, and hence, the effect of reducing the number of the signal lines is great. As a result, the system cost can be curtailed.

In a preferable example in one aspect of the invention, the transmitter units are respectively formed within controllers for accessing semiconductor memory, and they generate the currents corresponding to the logical values of access signals for accessing the semiconductor memory. The receiver unit is formed within the semiconductor memory in order to receive the access signals. Since the access signal line (the common signal line) can be used in common by the plurality of controllers, the number of the access signal lines can be reduced. As a result, the system cost can be curtailed.

In a preferable example in one aspect of the invention, the access signals are address signals for designating the memory cells of the semiconductor memories. In general, address signal lines are larger in number than other sorts of signal lines, and hence, the effect of reducing the number of the signal lines is great.

In a preferable example in one aspect of the invention, transmitter units are respectively formed within controllers for accessing semiconductor memory, and they generate the currents corresponding to the logical values of data signals which are to be written into the semiconductor memory. The receiver unit is formed within the semiconductor memory in order to receive the data signals. Since the write data signal line (the common signal line) can be used in common by the plurality of controllers, the number of the write data signal lines can be reduced. In general, data lines in semiconductor memories are larger in number than the other sorts of signal lines, and hence, the effect of reducing the signal lines is great. As a result, the system cost can be curtailed.

BRIEF DESCRIPTION OF THE DRAWINGS

The nature, principle, and utility of the invention will become more apparent from the following detailed description when read in conjunction with the accompanying drawings in which like parts are designated by identical reference numbers, in which:

FIG. 4 is an explanatory diagram showing the operations of transmitter units and a receiver unit;

DESCRIPTION OF THE PREFERRED EMBODIMENTS

Hereinafter, embodiments of the present invention will be described in conjunction with the drawings. Throughout the drawings, each signal line indicated by a thick line is constituted by a plurality of lines. Besides, part of a block to which the thick line is connected is constituted by a plurality of circuits. The same signs as the names of signals are used for signal lines on which the signals are propagated. Signals which bear "/" at their heads indicate negative logics.

Figure 1:
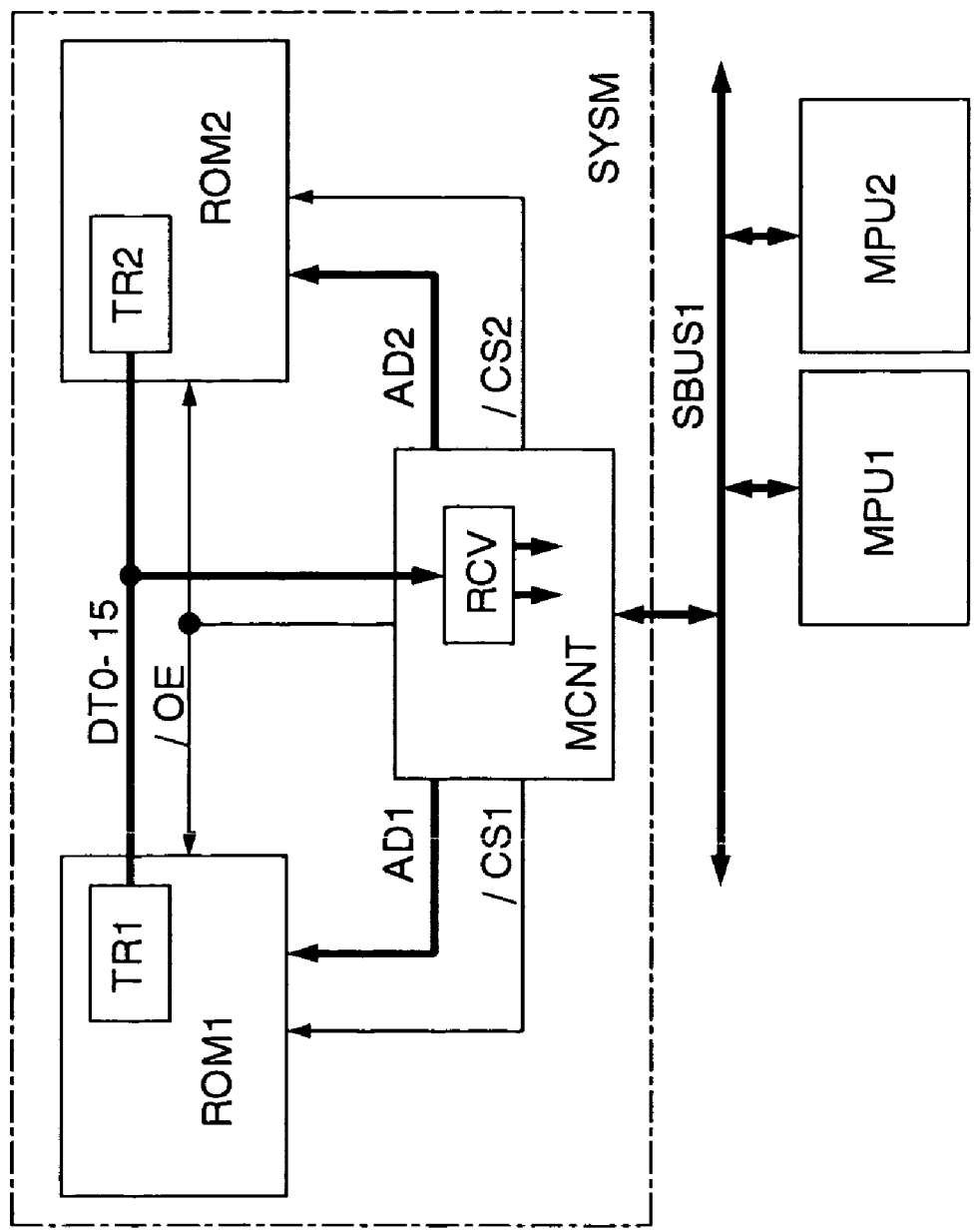
FIG. 1 is a block diagram showing the first embodiment of the present invention.

FIG. 1 shows the first embodiment of the signal interface of the invention. The signal interface is incarnated as, for example, a part of a system memory SYSM which is packaged in a portable equipment. Specifically, the signal interface is configured of a transmitter unit TR1 which is formed in a ROM1, a transmitter unit TR2 which is formed in a ROM2, a receiver unit RCV which is formed in a memory controller MCNT, and data lines DT0-15 (common signal lines) which connect the transmitter units TR1-2 and the receiver unit RCV. The system memory SYSM includes the ROM1-2 and the memory controller MCNT, and it is formed as one semiconductor chip. This system memory SYSM is connected to the system bus SBUS1 of the portable equipment through the memory controller MCNT. Connected to the system bus SBUS1 are MPU1 and MPU2 which control the operations of the portable equipment, and which access the ROM1 and ROM2, respectively.

The ROM1 is, for example, a mask ROM, in which programs to be run by the MPU1 are stored. The ROM2 is, for example, a flash memory of NOR type, in which programs to be run by the MPU2 are stored. This ROM2 is electrically programmable and erasable. In a write operation into the ROM2, the memory controller MCNT outputs a high voltage level (high logical level) or a low voltage level (low logical level) to the data lines DT0-15. The ROM2 receives the voltage levels of the data lines DT0-15 as the logical values of data, and writes the received logical values into memory cells. In FIG. 1, circuits relevant to the write operation of the ROM2 are omitted from illustration.

In reading out the program from the ROM1, the memory controller MCNT activates a chip select signal /CS1 and an output enable signal /OE to a low logical level, and it outputs an address signal AD1 indicating the memory cells from which data are to be read out. In reading out the program from the ROM2, the memory controller MCNT activates a chip select signal /CS2 and the output enable signal /OE to the low logical level, and it outputs an address signal AD2 indicating the memory cells from which data are to be read out. The data signals DT0-15 and the output enable signal /OE are signals which are common to the ROM1-2.

As will be explained later, the memory controller MCNT is capable of simultaneously read-accessing the ROM1-2. When accessed, the ROM1-2 generate currents on the data lines DT0-15 in accordance with the logical values of the program data read out from the memory cells not shown, respectively. When the ROM1-2 have been simultaneously accessed, the generated currents are synthesized on the data lines DT0-15, and they are propagated to the receiver unit RCV of the memory controller MCNT as a synthetic current.

The receiver unit RCV restores the logical values (program data) read out from the ROM1-2, in accordance with the synthetic current, respectively. This receiver unit RCV includes an output unit DOUT (shown in FIG. 2) which outputs the restored program data to the MPU1-2 through the system bus SBUS1 (output lines), respectively. Incidentally, the system bus SBUS1 includes the data lines independent of each other for the MPU1-2. Therefore, the output unit DOUT can output the program data respectively read out from the ROM1-2, to the system bus SBUS1 simultaneously.

In this manner, in the invention, the data different from each other as are read out from the ROM1-2 can be simultaneously received by employing the common data lines DT0-15. For this reason, the number of the data lines DT0-15 can be reduced. In general, the data lines of each of the ROM1-2 are of 8 bits or 16 bits, and the number of the bits is larger as compared with the number of bits of a control signal such as the chip select signal /CS. Therefore, the effect of reducing the signal lines is great.

Figure 2:
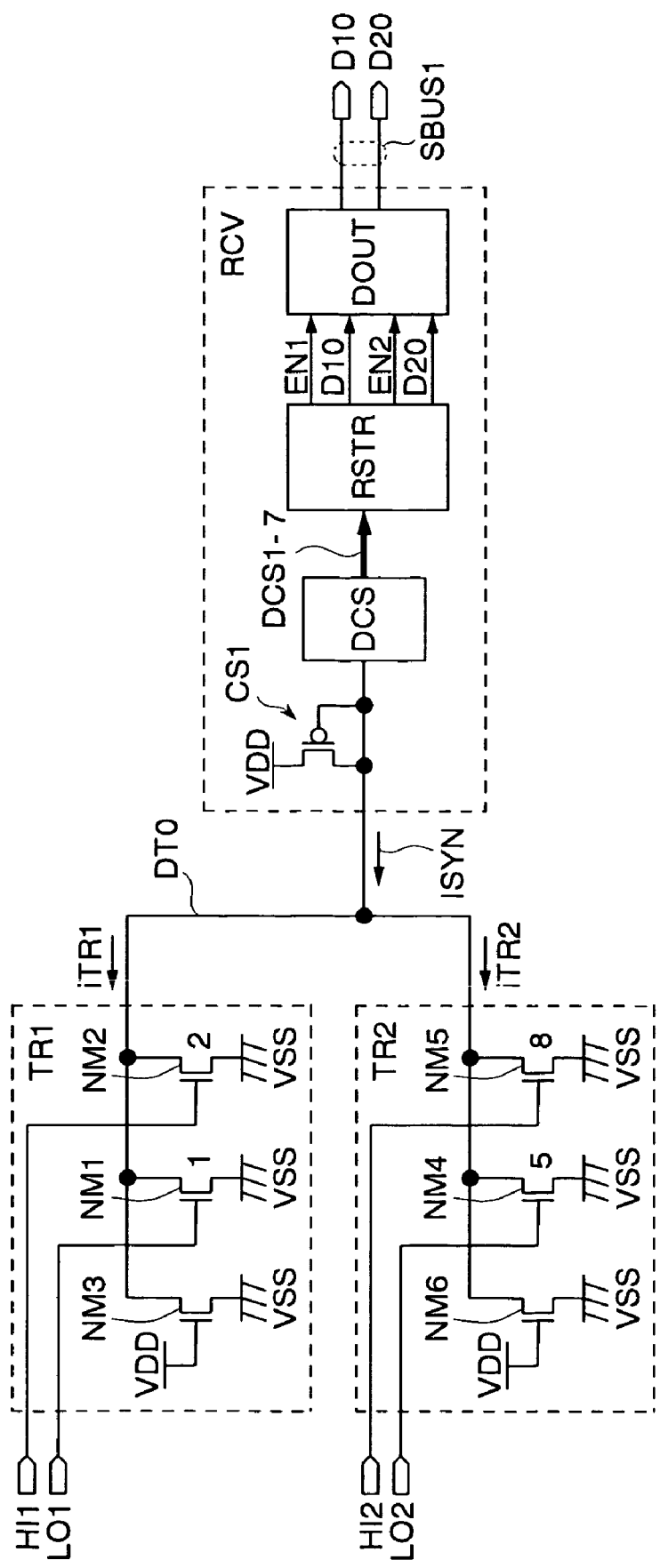
FIG. 2 is a circuit diagram showing the details of a signal interface shown in FIG. 1.

FIG. 2 shows the details of the signal interface shown in FIG. 1. Referring to FIG. 2, numerical values indicated by nMOS transistors denote the ratios of gate widths. As stated above, the signal interface of the invention is configured of the transmitter unit TR1 of the ROM1, the transmitter unit TR2 of the ROM2, the receiver unit RCV of the memory controller MCNT, and the data lines DT0-15. In FIG. 2, only the circuits corresponding to the data line DT0 are illustrated. The circuits corresponding to each of the data lines DT1-15 are the same as in FIG. 2.

The transmitter unit TR1 includes the nMOS transistors NM1 and NM2 whose gate widths have the ratio of 1:2, and the nMOS transistor NM3 which has a power supply line VDD connected to its gate. The nMOS transistor NM3 acts as a high-resistance resistor, and prevents the data line DT0 from floating. The ratio of the gate width of the nMOS transistor NM3 is, for example, "0.1".

The nMOS transistors NM1-3 have channel lengths equal to one another. Therefore, the nMOS transistor NM2 has a current drivability which is double that of the nMOS transistor NM1. The gates of the nMOS transistors NM1-2 receive data control signals LO1 and HI1 generated within the ROM1, respectively.

The data control signal LO1 changes from the low logical level to the high logical level when the logical value of the data read out from the memory cell of the ROM1 is at the low logical level. On this occasion, the nMOS transistor NM1 is turned ON, and a current i flows from the data line DT0 to a ground line VSS through the nMOS transistor NM1. Here, the "current i" is the ON current of the nMOS transistor NM1 whose gate width is "1". Such an ON current is proportional to the gate width.

The data control signal HI1 changes from the low logical level to the high logical level when the logical value of the data read out from the memory cell of the ROM1 is at the high logical level. On this occasion, the nMOS transistor NM2 is turned ON, and a current 2i flows from the data line DT0 to the ground line VSS through the nMOS transistor NM2. In this manner, when the data is outputted from the ROM1, either of the data control signals HI1 and LO1 changes to the high logical level in accordance with the logical value of the data. The transmitter unit TR2 is the same as the transmitter unit TR1 except that the gate widths of the nMOS transistors NM4 and NM5 are different from those of the nMOS transistors NM1-2. The nMOS transistors NM4-5 have channel lengths equal to those of the nMOS transistors NM1-2. The nMOS transistor NM4 has a current drivability which is five times that of the nMOS transistor NM1. The nMOS transistor NM5 has a current drivability which is eight times that of the nMOS transistor NM1. The nMOS transistor NM6 has a size equal to that of the nMOS transistor NM1, and acts as a high-resistance resistor.

The gates of the nMOS transistors NM4-5 receive data control signals LO2 and HI2 generated within the ROM2, respectively. The data control signal LO2 changes to the high logical level when the logical value of the data read out from the memory cell of the ROM2 is at the low logical level. On this occasion, the nMOS transistor NM4 is turned ON, and a current 5i flows from the data line DT0 to the ground line VSS through the nMOS transistor NM4. Besides, the data control signal HI2 changes to the high logical level when the logical value of the data read out from the memory cell of the ROM2 is at the high logical level. On this occasion, the nMOS transistor NM5 is turned ON, and a current 8i flows from the data line DT0 to the ground line VSS through the nMOS transistor NM5.

When the memory controller MCNT shown in FIG. 1 accesses the ROM1-2 simultaneously so as to read out the data simultaneously from the ROM1 and the ROM2, a synthetic current iSYN (iTR1+iTR2) into which a current iTR1 flowing through the transmitter unit TR1 and a current iTR2 flowing through the transmitter unit TR2 are synthesized flows through the data line DT0. The details of current values will be described later with reference to FIG. 4.

The receiver unit RCV includes a current source CS1 for feeding a current to the data line DT, a decision circuit DCS, a restoration circuit RSTR and the data output circuit DOUT. By way of example, the current source CS1 is configured of a PMOS transistor whose source is connected to the power supply line VDD, and whose gate and drain are connected to the data line DT0. The decision circuit DCS outputs decision signals DCS1-7 in accordance with the synthetic current iSYN. The details of the decision circuit DCS will be described later with reference to FIG. 3. The restoration circuit RSTR restores the logical values of the data read out from the ROM1-2 in accordance with the decision signals DCS1-7, and outputs the restored logical values as data signals D10 and D20. The data signal D10 is outputted together with an enable signal EN1 at the high logical level, when the data has been read out from the ROM1. The data signal D20 is outputted together with an enable signal EN2 at the high logical level, when the data has been read out from the ROM2.

The data output circuit DOUT outputs the data signals D10 and D20 corresponding to the enable signals EN1-2 of the high logical level, to the data lines D10 and D20 of the system bus SBUS1. That is, the data output circuit DOUT can simultaneously output the data signals D10 and D20 simultaneously received. Therefore, the receiver unit RCV can start the next reception operation early and can enhance the reception rate of the data.

By the way, in a case where the data is read out from only the ROM1, the enable signal EN2 is held at the low logical level. On this occasion, the data output circuit DOUT outputs only the data signal D10 and sets the output node of the data signal D20 in a floating state.

Figure 3:
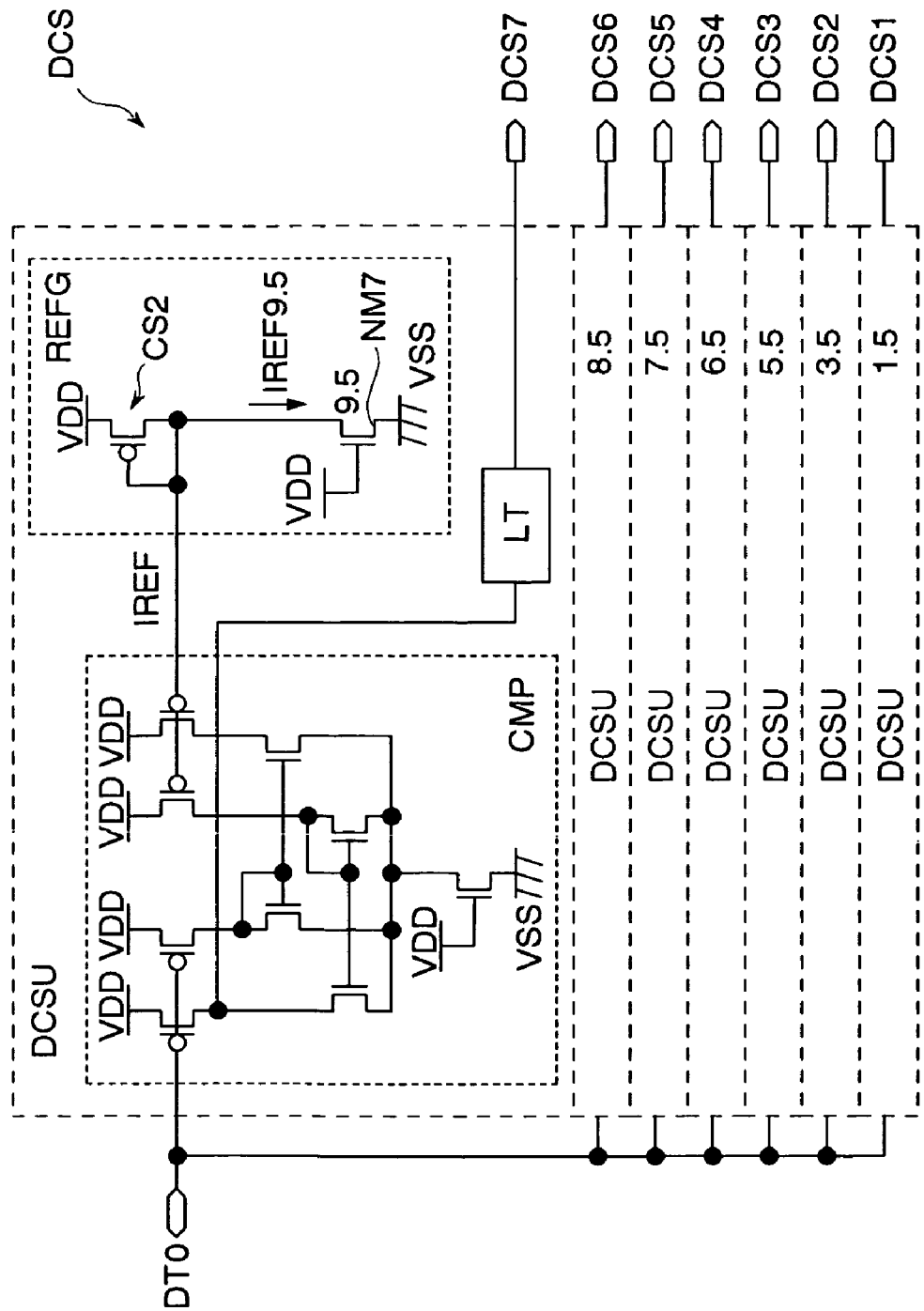
FIG. 3 is a circuit diagram showing the details of a decision circuit DCS shown in FIG. 2.

FIG. 3 shows the details of the decision circuit DCS shown in FIG. 2. The decision circuit DCS includes seven decision units DCSU which output the decision signals DSC1-7, respectively. The decision units DCSU have the same circuit arrangements except that the gate widths of nMOS transistors constituting reference-current generation units REFG to be explained later are different. Each decision unit DCSU includes a current comparison unit CMP, a latch LT and the reference-current generation unit REFG. In FIG. 3, only the decision circuit DCS corresponding to the data line DT0 is illustrated. Each of the decision circuits DCS corresponding to the data lines DT1-15 is the same as in FIG. 3.

The current comparison unit CMP is configured by combining two differential amplifiers. Each of the differential amplifiers includes a current mirror part which is constituted by nMOS transistors, and a differential part which is constituted by a pMOS transistor pair. The gates of the pMOS transistor pair on one side in the differential parts are connected to the data line DT0, while the gates of the pMOS transistor pair on the other side are connected to a reference current line IREF. The latch LT stores the output result of the current comparison unit CMP as a logical value.

Each reference-current generation unit REFG includes a current source CS2 and an nMOS transistor NM7. In the figure, a numerical value indicated by the nMOS transistor NM7 denotes the ratio of the gate width of this transistor. The ratio corresponds to the ratios of the gate widths of the nMOS transistors NM1-2 and NM4-5 shown in FIG. 2. The nMOS transistor NM7 has a channel length equal to those of the nMOS transistors NM1-2 and NM4-5. The nMOS transistors NM7 of the seven reference-current generation units REFG have gate widths which are 9.5-1.5 times the gate width of the nMOS transistor NM1 shown in FIG. 2.

The current source CS2 includes a pMOS transistor whose source is connected to the power supply line VDD, and whose gate and drain are connected to the reference current line IREF. The PMOS transistor of the current source CS2 is formed at a size equal to that of the pMOS transistor of the current source CS1 shown in FIG. 2, and it has the same current-feed ability. Each reference-current generation unit REFG feeds the reference current line IREF with a current which is obtained in such a way that a current extracted by the nMOS transistor NM7 is subtracted from a current generated by the current source CS2.

In each current comparison unit CMP, in a case where the synthetic current iSYN shown in FIG. 2 is larger than a reference current IREF9.5 (or IREF8.5, IREF7.5, IREF6.5, IREF5.5, IREF3.5 or IREF1.5, not shown, corresponding to the gate width of the nMOS transistor NM7), the absolute value of the gate-to-source voltage of each pMOS transistor connected to the data line DT0 becomes larger than that of the gate-to-source voltage of each pMOS transistor to which the reference current line IREF is connected. Therefore, the input of the latch LT becomes the high logical level. Likewise, in a case where the synthetic current iSYN is smaller than the reference current IREF (any of the IREF9.5-1.5), the input of the latch LT becomes the low logical level. The latch LT holds the received logical level, and outputs this logical level as the corresponding one of the decision signals DCS1-7.

FIG. 4 shows the operations of the transmitter units TR1-2 and receiver unit RCV stated above. In the invention, the values of the currents iTR1-2 which the transmitter units TR1-2 generate in correspondence with the logical values are all different. Therefore, the value of the synthetic current iSYN differs from each other in accordance with the combination of the logical values. Accordingly, the receiver unit RCV can restore the logical values outputted from the respective transmitter units TR1-2, on the basis of the synthetic current iSYN.

By way of example, when the high logical level (H) is read out from both the ROM1-2, the synthetic current iSYN which is the sum of the currents iTR1-2 generated by the respective transmitter units TR1-2 becomes 10i. On this occasion, the decision circuit DCS holds all the decision signals DCS1-7 at the high logical level (H). The restoration circuit RSTR shown in FIG. 2 sets the enable signals EN1-2 at the high logical level (H) in accordance with the logics of the decision signals DCS1-7, and it simultaneously outputs the data signals D10 and D20 of the high logical level (H). Here, the logical levels of the data signals D10 and D20 are the same as the logics indicated in the transmitter units TR1-2. Thus, the two data signals transferred by employing one data line DT0 can be simultaneously received.

When the low logical level (L) is read out from both the ROM1-2, the synthetic current iSYN becomes 6i. On this occasion, the decision circuit DCS holds the decision signals DCS1-3 at the high logical level (H) and holds the decision signals DCS4-7 at the low logical level (L). The restoration circuit RSTR sets the enable signals EN1-2 at the high logical level (H) in accordance with the logics of the decision signals DCS1-7, and it simultaneously outputs the data signals D10 and D20 of the low logical level (L).

When the data is read out from one of the ROM1-2, the synthetic current iSYN becomes equal to the current (either of the currents iTR1-2) generated by the transmitter unit (TR1 or TR2) of the ROM from which the data is read out. The restoration circuit RSTR sets one of the enable signals EN1-2 at the high logical level (H) in accordance with the logics of the decision signals DCS1-7, and it outputs only the corresponding data signal (one of the D10 and D20).

In the first embodiment described above, the currents iTR1-2 corresponding to the logical values of the data signals outputted from the transmitter units TR1-2 are propagated to the receiver unit RCV as the synthetic current iSYN, whereby the number of the data lines DT0-15 can be reduced. The receiver unit RCV can simultaneously receive the signals transmitted from the transmitter units TR1-2, by employing the common data lines DT0-15. Accordingly, even in a case where the number of the data lines DT0-15 is small, the execution efficiencies of the programs by the MPU1-2 can be prevented from lowering. Since the wiring region of the data lines DT0-15 can be made small, the chip size of the system memory SYSM can be reduced. In general, a semiconductor memory such as ROM is large in the number of bits of data lines. Therefore, the effect of lowering a system cost by the application of the invention is great.

Figure 5:
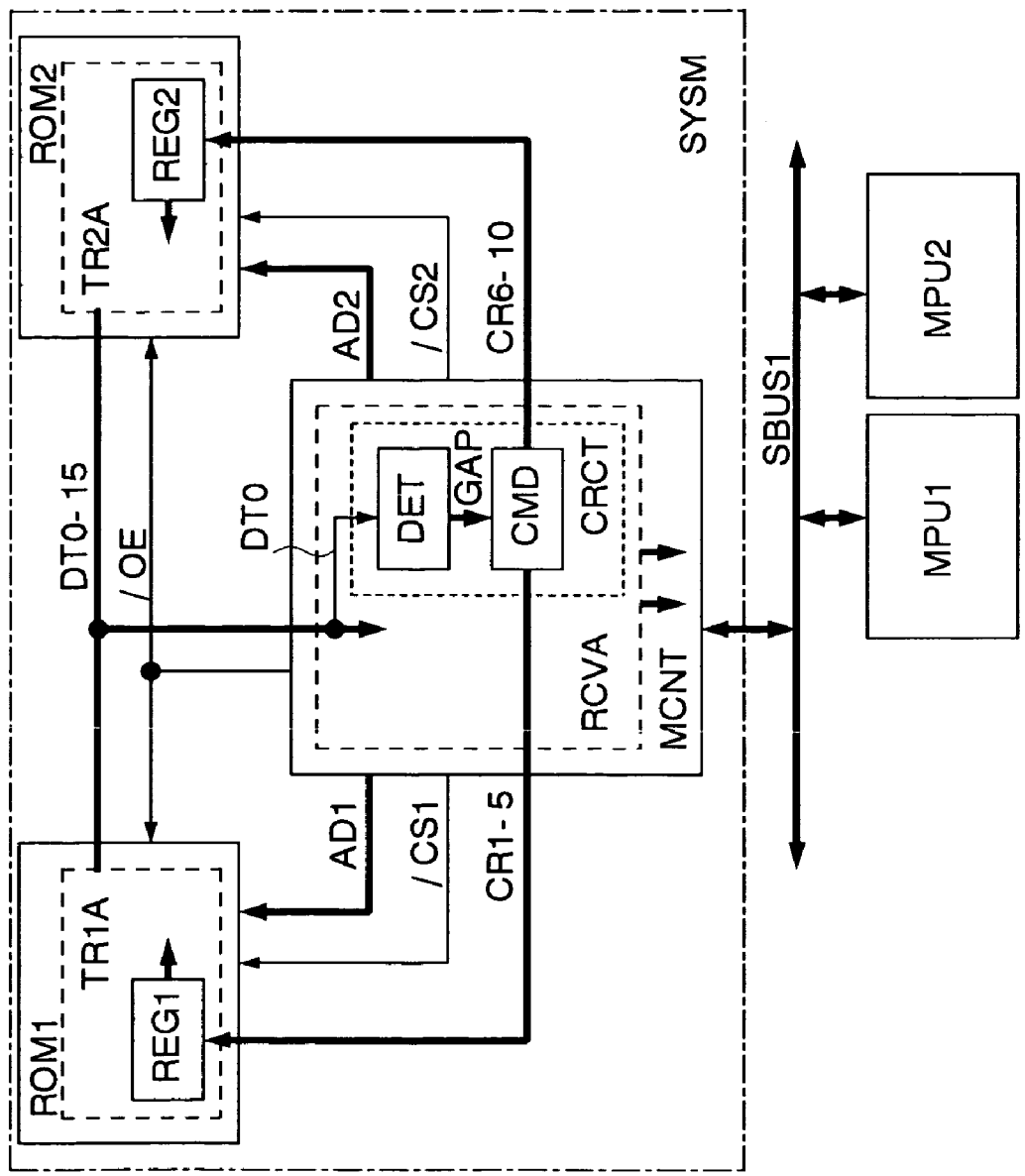
FIG. 5 is a block diagram showing the second embodiment of the invention.

FIG. 5 shows the second embodiment of the invention. The same constituents as the constituents described in the first embodiment are assigned the same signs, and they shall be omitted from detailed description. In the second embodiment, transmitter units TR1A and TR2A and a receiver unit RCVA are respectively formed instead of the transmitter units TR1 and TR2 and the receiver unit RCV in the first embodiment. Besides, correction signals CR1-5 and CR6-10 are fed from the receiver unit RCVA to the transmitter units TR1A and TR2A. The remaining configuration is the same as in the first embodiment. In the second embodiment, the function of correcting currents iTR1-2 generated by the transmitter units TR1A and TR2A is added to the first embodiment. The signal interface is incarnated as, for example, part of a system memory SYSM which is packaged in a portable equipment.

The transmitter unit TR1A includes a register unit REG1 (transmission correction unit) which holds the logical values of the correction signals CR1-5 therein. Likewise, the transmitter unit TR2A includes a register unit REG2 (transmission correction unit) which holds the logical values of the correction signals CR6-10 therein. The register units REG1-2, not only holds the correction signals CR1-5 and CR6-10, but also outputs the held correction signals CR1-5 and CR6-10 to the gates of correction transistors CRT shown in FIG. 6 to be referred to later. Thus, currents iTR1 and iTR2 which are respectively generated by the transmitter units TR1A and TR2A are corrected in accordance with the correction signals CR1-5 and CR6-10 which are respectively held in the register units REG1-2.

The reception unit RCVA includes a receiver correction unit CRCT for generating the correction signals CR1-10, in addition to the function of the receiver unit RCV of the first embodiment. The receiver correction unit CRCT includes a detection circuit DET and a command generation circuit CMD which operate during an initialization period at the power-ON of the system memory SYSM.

The detection circuit DET monitors the currents iTR1 and iTR2 which are respectively generated by the transmitter units TR1A and TR2A. By way of example, the monitoring is performed as to a case where the respective transmitter units TR1A and TR2A output the currents iTR1-2 corresponding to the data signals DT0 of high logical level and low logical level. The detection circuit DET evaluates the deviation magnitudes between the monitored current values iTR1-2 and expected values, and it outputs deviation signals GAP corresponding to the deviation magnitudes, to the command generation circuit CMD. Here, the expected values are ideal current values iTR1-2 which the transmitter units TR1A and TR2A ought to output in order that the logical values read out from the respective ROM1-2 may be properly reproduced by the receiver unit RCVA. The command generation circuit CMD outputs the correction signals CR1-5 (or CR6-10) for zeroizing the deviation magnitude of the current as indicated by the deviation signal GAP, to the register unit REG1 (or the register unit REG2). The correcting operations are performed, for example, until the deviation magnitudes between the current values iTR1-2 and the expected values becomes the least.

The correcting operations of the current iTR1-2 are performed at the initialization of the system memory SYSM, whereby the receiver unit RCVA can thereafter restore the currents iTR1-2 to be generated by the respective transmitter units TR1A and TR2A, to correct logical values. Incidentally, the correcting operations of the currents iTR1-2 may well be performed in response to requests from MPU1-2 or other controllers. By way of example, the correcting operations are performed in accordance with the change of a temperature or the change of a supply voltage, whereby the receiver unit RCVA can be prevented from outputting erroneous data. In this case, the receiver unit RCVA is formed with a temperature detection part or a voltage detection part. Alternatively, the receiver unit RCVA is formed with a terminal which receives temperature information or voltage information.

Figure 6:
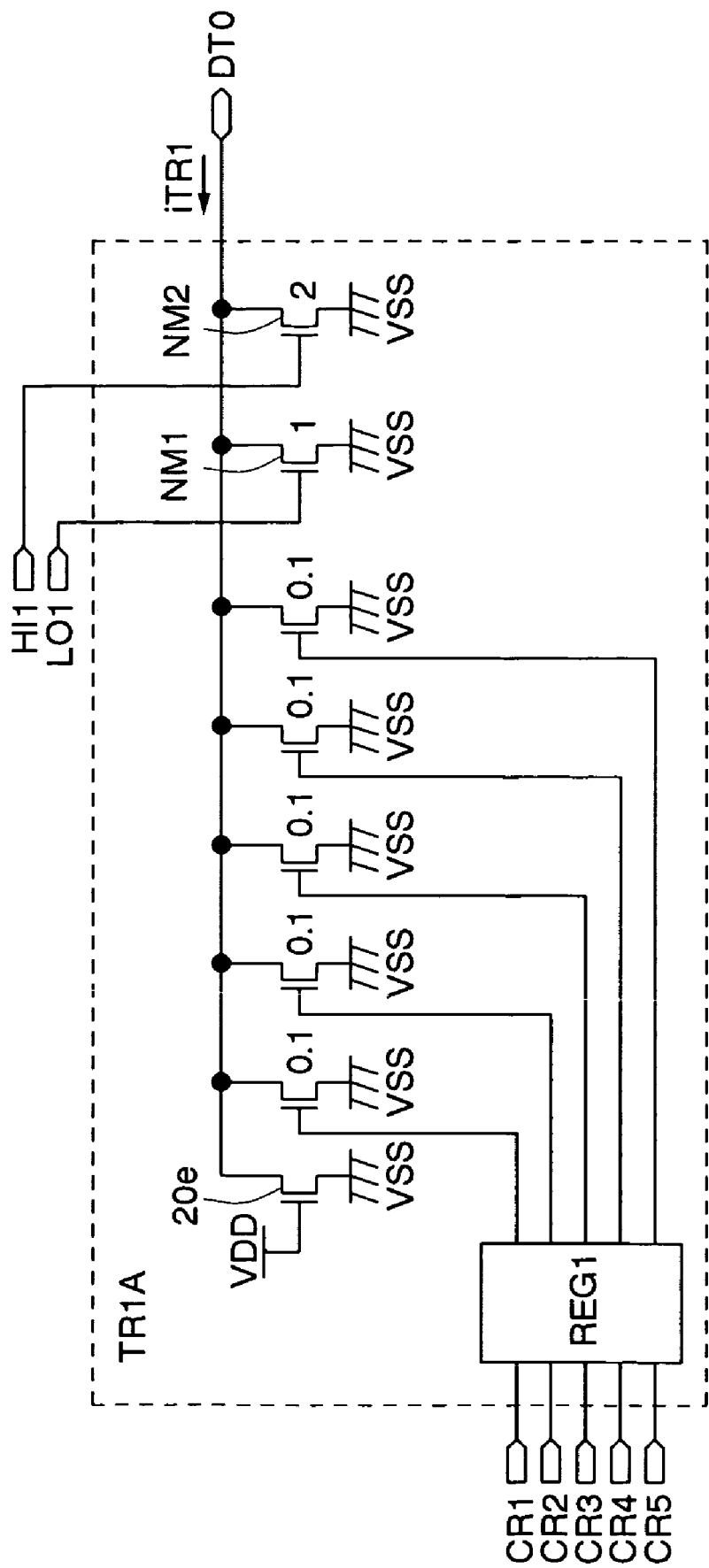
FIG. 6 is a circuit diagram showing the details of a transmitter unit shown in FIG. 5.

FIG. 6 shows the details of the transmitter unit TR1A shown in FIG. 5. In FIG. 6, only the circuits of the transmitter unit TR1A corresponding to the data line DT0 are illustrated. The circuits of the transmitter unit TR1A corresponding to each of the data lines DT1-15 are the same as in FIG. 6. The transmitter unit TR1A is configured in such a manner that the register unit REG1, and five nMOS transistors whose gates are connected to the outputs of the register unit REG1 are added to the transmitter unit TR1 in the first embodiment. The gate width of each of the nMOS transistors added anew is "0.1".

The command generation circuit CMD shown in FIG. 5 sets the correction signals CR1-3 at the high logical level and the correction signals CR4-5 at the low logical level in a standard state. In the transmitter unit TR1A, therefore, the three nMOS transistors having the gate widths of "0.1" are normally ON. The receiver unit RCVA is designed so as to be capable of properly restoring the logical values from the current iTR1 in the standard state. In the correcting operation, when the detection circuit DET decides that the value of the current iTR1 is small, the correction signal CR4 or the correction signals CR4-5 is/are set at the high logical level. When the detection circuit DET decides that the value of the current iTR1 is large, at least one of the correction signals CR1-3 is set at the low logical level.

Incidentally, the transmitter unit TR2A formed in the ROMZ is the same in configuration as the transmitter unit TR1A, except that the gate widths of the nMOS transistors NM4-5 corresponding to the nMOS transistors NM1-2 are different. That is, the transmitter unit TR2A is configured in such a manner that the register unit REG2, and five nMOS transistors whose gates are connected to the outputs of the register unit REG2 and each of which has a gate width of "0.1" are added to the transmitter unit TR2 in the first embodiment.

Also in the second embodiment described above, the same advantages as in the first embodiment can be attained. Further, the receiver correction unit CRCT is formed, whereby the transmitter units TR1A and TR2A can generate the optimum currents iTR1-2 in accordance with the reception situation of the receiver unit RCVA. Accordingly, the receiver unit RCVA can be prevented from restoring any erroneous logical value.

Figure 7:
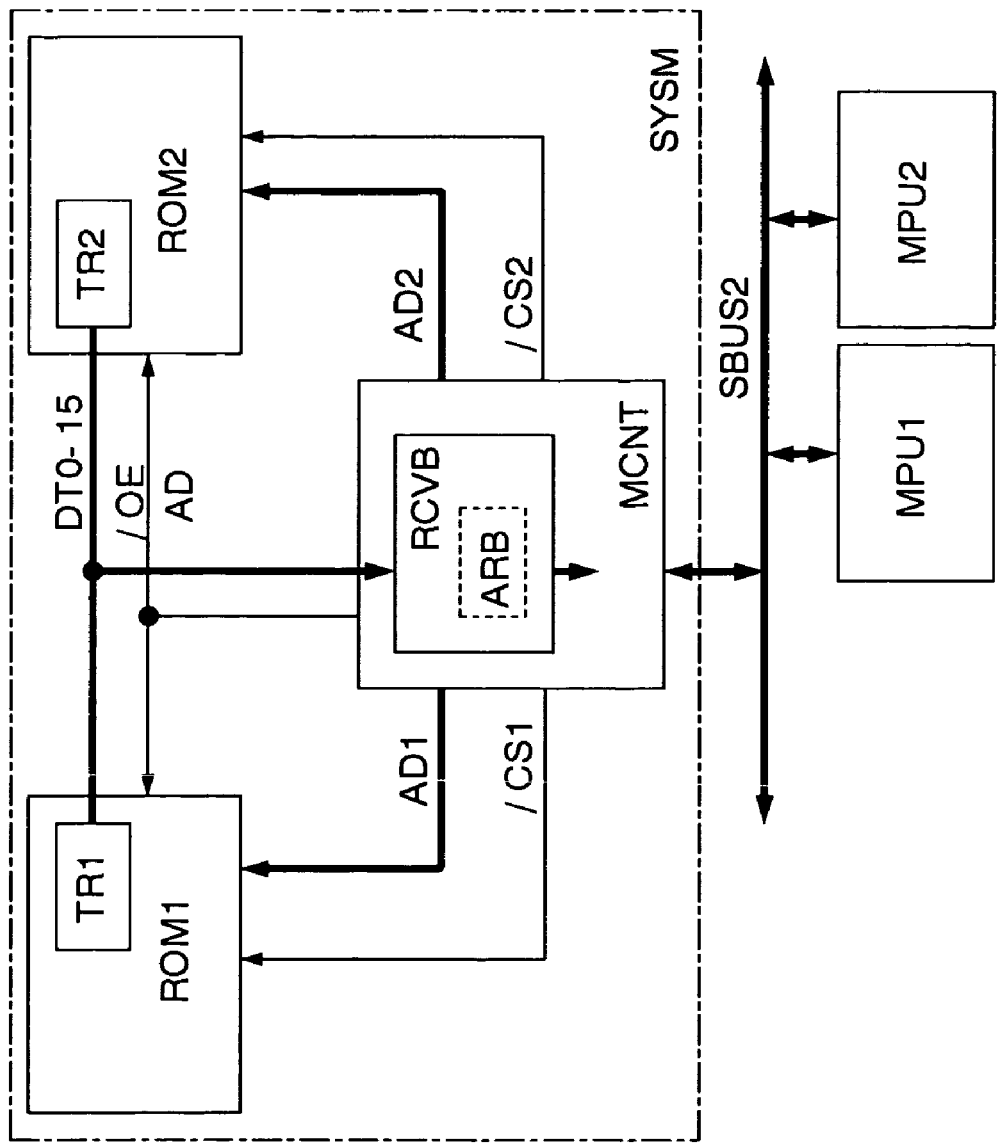
FIG. 7 is a block diagram showing the third embodiment of the invention.

FIG. 7 shows the third embodiment of the invention. The same constituents as the constituents described in the first embodiment are assigned the same signs, and they shall be omitted from the detailed description. In the third embodiment, a receiver unit RCVB and a system bus SBUS2 are respectively formed instead of the receiver unit RCV and the system bus SBUS1 in the first embodiment. The remaining configuration is the same as in the first embodiment. The signal interface is incarnated as, for example, part of a system memory SYSM which is packaged in a portable equipment.

In this embodiment, the system bus SBUS2 includes data lines (output lines) common to MPU1-2. Since two data signals simultaneously received from transmitter units TR1-2 cannot be simultaneously outputted to the MPU1-2, the receiver unit RCVB includes an arbiter ARB which successively outputs the data signals to the system bus SBUS2. The arbiter ARB decides the output sequence of logical values respectively restored in correspondence with the transmitter units TR1-2, and outputs the logical values to the common data lines in the decided sequence. The remaining configuration of the receiver unit RCVB is the same as in the receiver unit RCV in the first embodiment.

Figure 8:
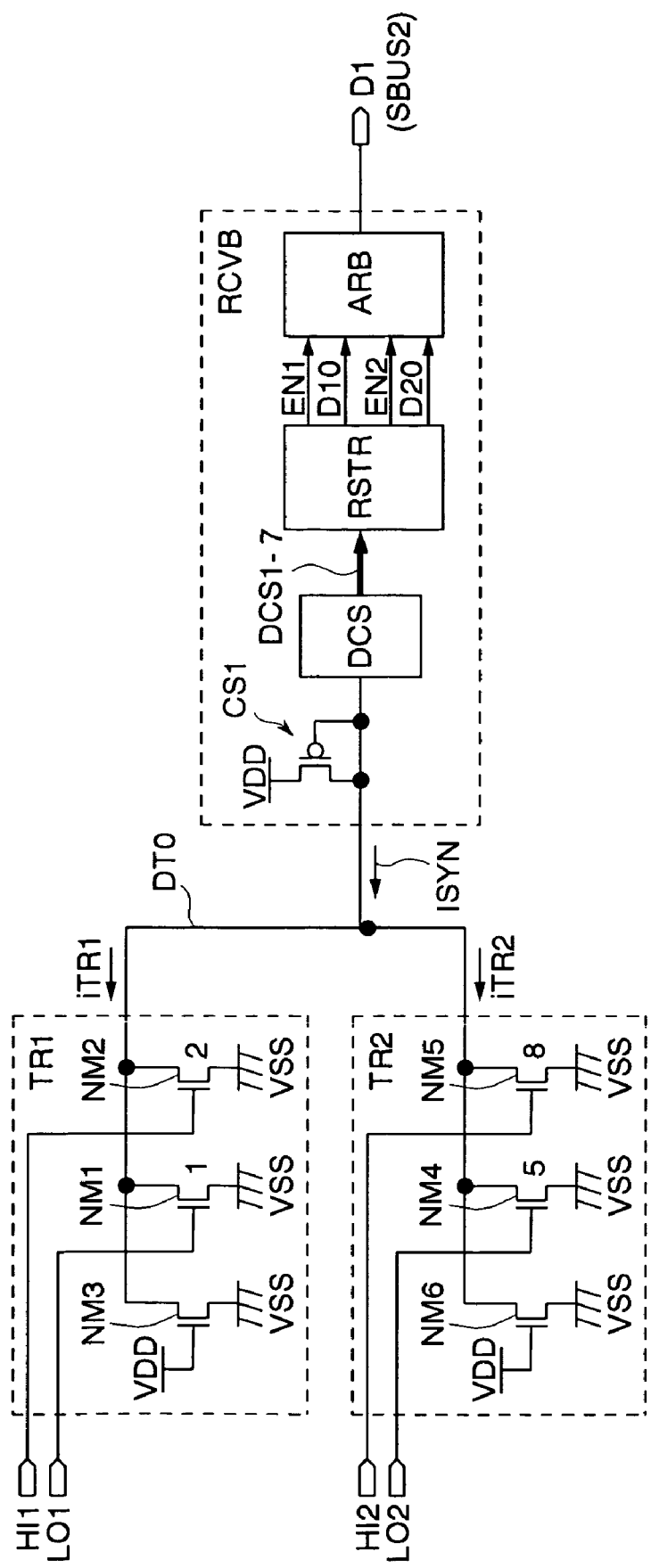
FIG. 8 is a circuit diagram showing the details of a signal interface shown in FIG. 7.

FIG. 8 shows the details of the signal interface shown in FIG. 7. The receiver unit RCVB includes the arbiter ARB instead of the data output circuit DOUT of the receiver unit RCV in the first embodiment. When enable signals EN1-2 are both at a high logical level, the arbiter ARB outputs data signals D10 and D20 to the data line D1 of the system bus SBUS2 in accordance with predetermined priority levels. By way of example, in a case where the operation of the MPU1 is preferred to that of the MPU2 in the portable equipment, the data signal D10 is outputted earlier. The arbiter ARB may well receive priority signals from the MPU1-2 or other controllers in order to alter the priority levels.

Also in the third embodiment described above, the same advantages as in the first embodiment can be attained. Further, the invention is applicable to the system memory SYSM which is connected to the system bus SBUS2 having the data lines common to ROM1-2. As a result, the wiring region of the data lines can be reduced, and a system cost can be curtailed.

Figure 9:
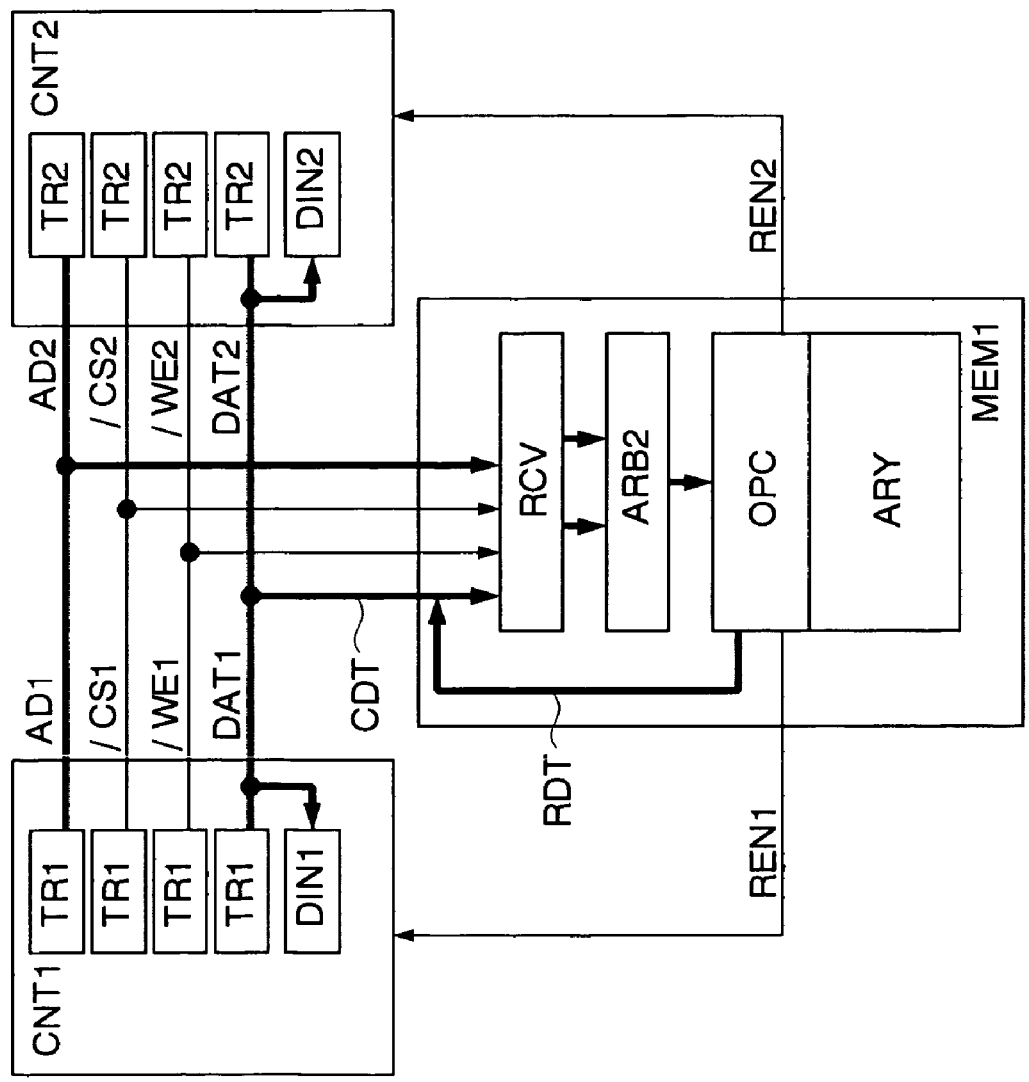
FIG. 9 is a block diagram showing the fourth embodiment of the invention.

FIG. 9 shows the fourth embodiment of the signal interface of the invention. The same constituents as the constituents described in the first embodiment are assigned the same signs, and they shall be omitted from detailed description. The signal interface of the fourth embodiment is incarnated as, for example, part of circuitry which is packaged in a portable equipment. Concretely, the signal interface includes a semiconductor memory MEM1 such as pseudo SRAM or SRAM, microprocessors or the like controllers CNT1 and CNT2 which access the semiconductor memory MEM1, and signal lines which connect the controllers CNT1-2 and the semiconductor memory MEM1.

In this embodiment, address signals AD1 and AD2, chip select signals /CS1 and /CS2, write enable signals /WE1 and /WE2, and write data signals DAT1 and DAT2 are simultaneously fed to the semiconductor memory MEM1 through the common signal lines, respectively. For this purpose, the controllers CNT1-2 include the same transmitter units TR1 and TR2 as in the first embodiment, and the semiconductor memory MEM1 includes the same receiver unit RCV as in the first embodiment. As stated before, the transmitter units TR1 generate currents iTR1 corresponding to a plurality of logical values. The transmitter units TR2 generate currents iTR2 corresponding to a plurality of logical values. The receiver unit RCV is connected to the common signal lines (CDT, etc.), and it restores the logical values generated by the transmitter units TR1-2, in accordance with synthetic currents iSYN flowing through the common signal lines.

In this manner, the access signals for accessing the memory MEM1, such as the address signals AD1-2, chip select signals /CS1-2 and write enable signals /WE1-2, and the write data signals DAT1-2 into the memory MEM1 are respectively transferred as the synthetic currents iSYN, whereby the numbers of the signal lines which are formed between the controllers CNT1-2 and the memory MEM1 can be reduced. Especially in the semiconductor memory, the numbers of the address signal lines AD1-2 and the data signal lines DAT1-2 are relatively large, and hence, the effect of reducing the signal lines is great.

In order to read out data from the memory MEM1 (read access), the controller CNT1 outputs the chip select signal /CS1 of low logical level and the write enable signal /WE1 of high logical level as the current iTR1 and outputs the address signal AD1 indicating memory cells to-be-accessed, as the current iTR1. Likewise, in order to read out data from the memory MEM1, the controller CNT2 outputs the chip select signal /CS2 of the low logical level and the write enable signal /WE2 of the high logical level as the current iTR2 and outputs the address signal AD2 indicating memory cells to-be-accessed, as the current iTR2.

Read data signals RDT are outputted from the memory MEM1 to the controllers CNT1-2 through the common data line CDT as binary logic signals. In order to receive the read data signals RDT, the controllers CNT1-2 include data input circuits DIN1 and DIN2 for deciding the voltage levels (high logical level or low logical level) of the read data signals RDT, respectively.

In order to write data into the memory MEM1 (write access), the controller CNT1 outputs the chip select signal /CS1 of the low logical level and the write enable signal /WE1 of the low logical level as the current iTR1 and outputs the address signal AD1 indicating memory cells to-be-accessed and a write data signal, as the current iTR1. Likewise, in order to write data into the memory MEM1, the controller CNT2 outputs the chip select signal /CS2 of the low logical level and the write enable signal /WE2 of the low logical level as the current iTR2 and outputs the address signal AD2 indicating memory cells to-be-accessed and a write data signal, as the current iTR2.

The memory MEM1 includes the receiver unit RCV, an arbiter ARB2, an operation control unit OPC and a memory cell array ARY. In a case, for example, where the write data signals DAT1 and DAT2 are simultaneously outputted from the receiver unit RCV, the arbiter ARB2 successively outputs the write data signals DAT1 and DAT2 to the operation control unit OPC in accordance with the priority levels of access. The operations of the arbiter ARB2 for the address signals AD1 and AD2, chip select signals /CS1 and /CS2, and write enable signals /WE1 and /WE2 are the same. In this example, the arbiter ARB2 prefers the operation of the controller CNT1 to that of the controller CNT2.

The operation control unit OPC executes a read operation or a write operation for the memory cell array ARY in accordance with the access signals (AD1, AD2, /CS1, /CS2, /WE1 and /WE2) fed from the arbiter ARB2. In the read operation, the operation control unit OPC sets a read enable signal REN1 at the high logical level when it outputs the read data signal RDT to the controller CNT1 through the common data line CDT. Besides, the operation control unit OPC sets a read enable signal REN2 at the high logical level when it outputs the read data signal RDT to the controller CNT2 through the common data line CDT. Thus, the respective controllers CNT1-2 can know timings at which the read data signals RDT have been outputted to the common data lines CDT.

Figure 10:
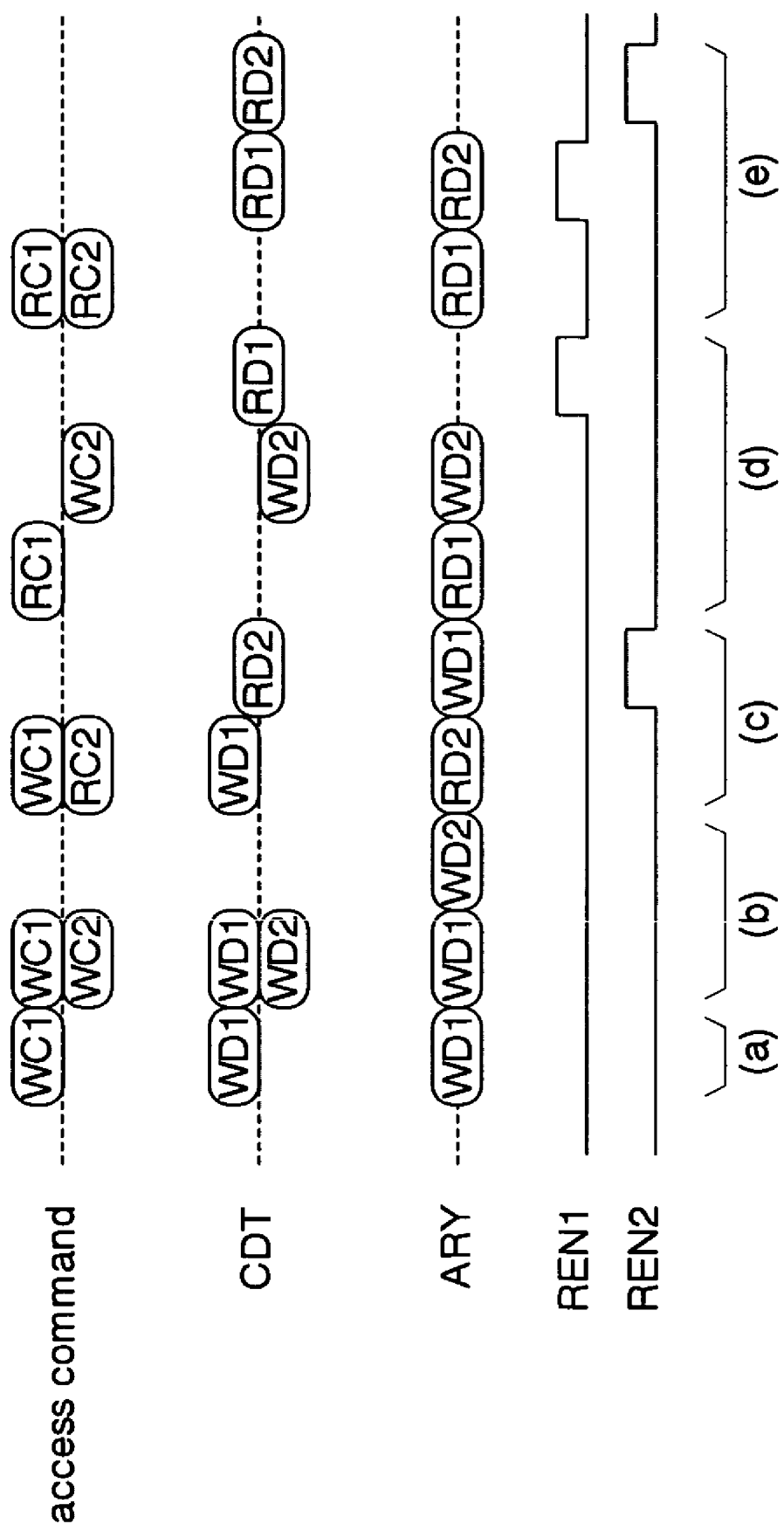
FIG. 10 is a timing chart showing the operation of a signal interface in the fourth embodiment.

FIG. 10 shows the operation of the signal interface in the fourth embodiment. A write command WC1 and a read command RC1 in the figure are outputted from the controller CNT1. A write command WC2 and a read command RC2 are outputted from the controller CNT2.

When the arbiter ARB2 of the memory MEM1 has received the write command (access signal) WC1 from only the controller CNT1, it causes the memory cell array ARY to execute the write operation responsive to the write command WC1. Thus, a write data signal WD1 received together with the write command WC1 is written into the memory array ARY ((a) in FIG. 10).

When the arbiter ARB2 has simultaneously received the write commands WC1 and WC2 from the controllers CNT1-2, it causes the memory cell array ARY to successively execute the write operations responsive to the write commands WC1 and WC2. Thus, write data signals WD1-2 received together with the write commands WC1-2 are successively written into the memory array ARY ((b) in FIG. 10).

When the arbiter ARB2 have simultaneously received the write command WC1 and the read command RC2 from the controllers 1-2, it causes the memory cell array ARY to execute the read operation responsive to the read command RC2. For the earlier execution of the read operation, the arbiter ARB2 temporarily holds the write command WC1, and the write data signal WD1 received together with the write command WC1. In addition, after a read data signal RD2 has been read out from the memory cell array ARY, the write data signal WD1 is written into the memory array ARY. The operation control circuit OPC outputs the read data signal RD2 to the common data line CDT, together with the read enable signal REN2 ((c) in FIG. 10).

When the arbiter ARB2 has successively received the read command RC1 and the write command WC2 from the controllers CNT1-2, it causes the memory cell array ARY to execute the read operation responsive to the read command RC1. The write data signal WD2 is written into the memory array ARY after the read data signal RD1 has been read out from the memory cell array ARY. While the common data line CDT is being used by the write data signal WD2 (current iTR2), the operation control circuit OPC temporarily holds the read data signal RD1. In addition, the operation control circuit OPC outputs the read data signal RD1 to the common data line CDT, together with the read enable signal REN1 ((d) in FIG. 10).

When the arbiter ARB2 has simultaneously received the read commands RC1-2 from the controllers CNT1-2, it causes the memory cell array ARY to execute the read operation responsive to the read command RC1, and it holds the read command RC2. In addition, after the read data signal RD1 has been read out from the memory cell array ARY in response to the read command RC1, the read operation responsive to the read command RC2 is executed. The read data signals RD1-2 are successively read out through the common data line CDT in synchronism with the read enable signals REN1-2 ((e) in FIG. 10).

Also in the fourth embodiment described above, the same advantages as in the first embodiment can be attained.

Further, the access signals (AD1-2, /CS1-2 and /WE1-2) and the write data signals DT1-2, which are outputted from the controllers CNT1-2, are transferred to the memory MEM1 as the synthetic current iSYN, whereby the number of the signal lines can be reduced. As a result, a system cost can be curtailed.

Figure 11:
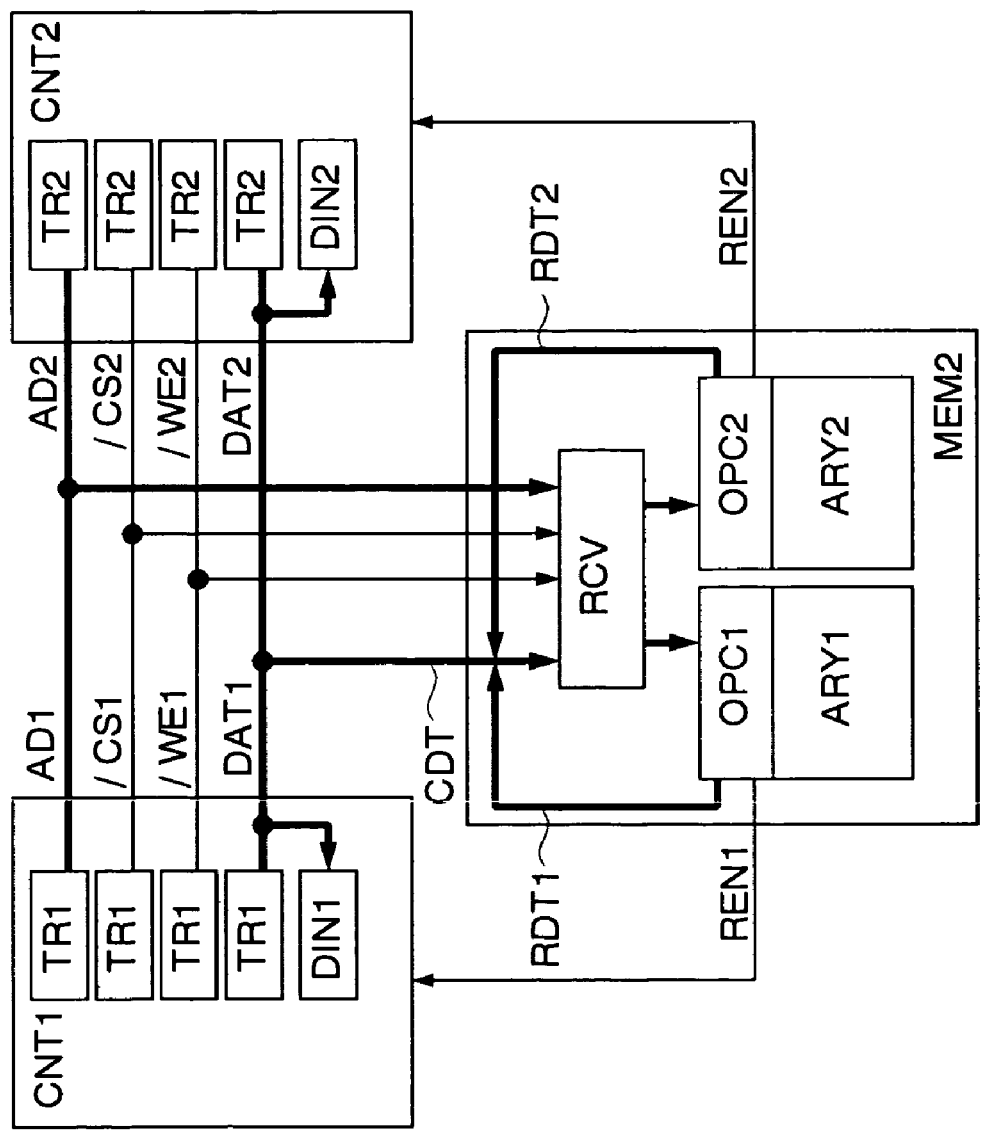
FIG. 11 is a block diagram showing the fifth embodiment of the invention.

FIG. 11 shows the fifth embodiment of the signal interface of the invention. The same constituents as the constituents described in the first and fourth embodiments are assigned the same signs, and they shall be omitted from detailed description. In the fifth embodiment, a semiconductor memory MEM2 is formed instead of the semiconductor memory MEM1 in the fourth embodiment. The remaining configuration is the same as in the fourth embodiment. The memory MEM2 independently includes an operation control circuit OPC1 and a memory cell array ARY1 which correspond to a controller CNT1, and an operation control circuit OPC2 and a memory cell array ARY2 which correspond to a controller CNT2. The signal interface is incarnated as, for example, part of a system memory SYSM which is packaged in a portable equipment.

The operation control circuits OPC1-2 operate independently of each other. Therefore, even in a case where a receiver unit RCV has simultaneously received access signals from controllers CNT1-2, it is capable of simultaneously outputting the access signals to the operation control circuits OPC1-2. The operation control circuits OPC1 and OPC2 include read data lines RDT1 and RDT2 for outputting read data signals (RD1 and RD2 shown in FIG. 12) read out from the memory cell arrays ARY1 and ARY2, to a common data line CDT, respectively. Besides, the operation control circuits OPC1 and OPC2 have the function of arbitrating for the use right of the common data line CDT in order to prevent the read data signals RD1 and RD2 from conflicting with each other, and to prevent the read data signal RD1 (or RD2) from conflicting with a write data signal WD2 (or WD1).

Figure 12:
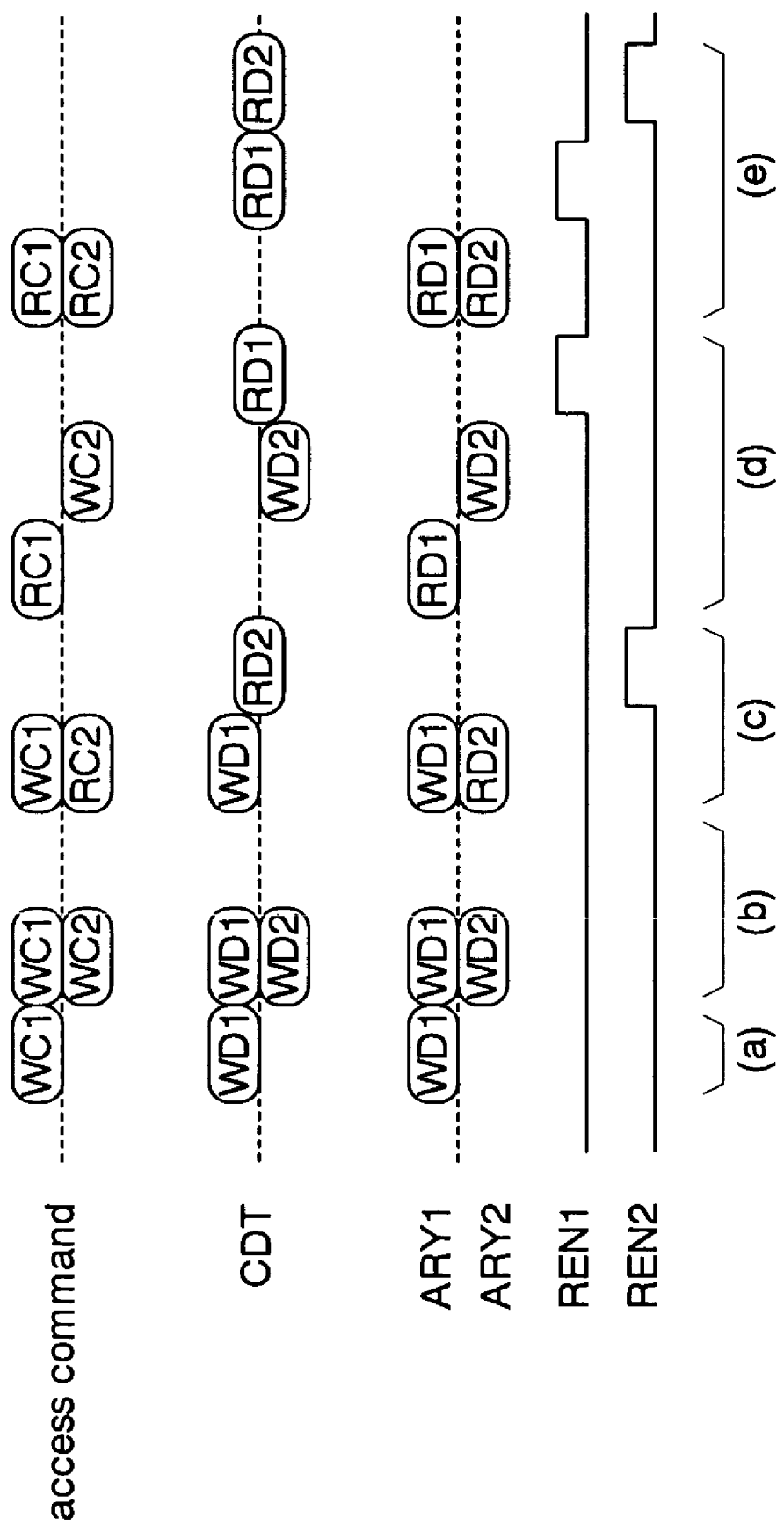
FIG. 12 is a timing chart showing the operation of a signal interface in the fifth embodiment.

FIG. 12 shows the operation of the signal interface in the fifth embodiment. The output sequence of a write command WC1 and a read command RC1 is the same as in the fourth embodiment (FIG. 10). In this embodiment, the memory cell arrays ARY1-2 operate independently, so that when write commands WC1-2 have been simultaneously fed, write operations can be simultaneously executed ((b) in FIG. 12). Besides, when the write command WC1 and a read command RC2 have been simultaneously fed, the write operation and a read operation can be simultaneously executed ((c) in FIG. 12). When the read commands RC1-2 have been simultaneously fed, the read operations can be simultaneously executed ((e) in FIG. 12). The other operations are the same as in FIG. 10.

Also in the fifth embodiment described above, the same advantages as in the first and fourth embodiments can be attained. Further, the memory arrays ARY1-2 corresponding to the respective controllers CNT1-2 are independently formed, so that even when the access commands have been simultaneously fed from the controllers CNT1-2, the memory arrays ARY1-2 can simultaneously execute the access operations (write operations or read operations).

Figure 13:
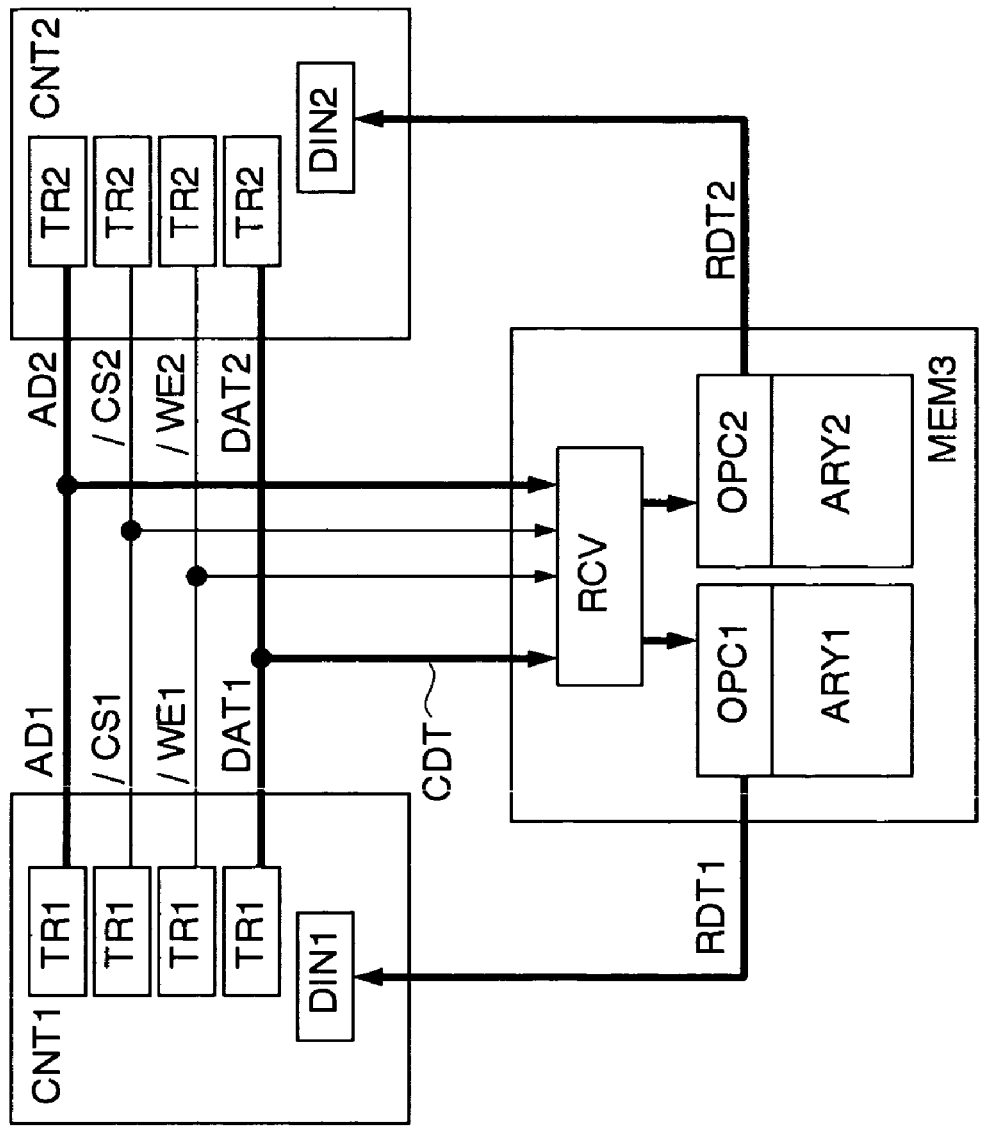
FIG. 13 is a block diagram showing the sixth embodiment of the invention.

FIG. 13 shows the sixth embodiment of the signal interface of the invention. The same constituents as the constituents described in the first, fourth and fifth embodiments are assigned the same signs, and they shall be omitted from detailed description. In the sixth embodiment, a semiconductor memory MEM3 is formed instead of the semiconductor memory MEM2 in the fifth embodiment. Also formed are read data signal lines RDT1 and RDT2 which independently propagate read data signals RD1-2 (shown in FIG. 14) from memory cell arrays ARY1-2, to the data input circuits DIN1-2 of controllers CNT1-2, respectively. Read enable signals REN1-2 are not outputted. The remaining configuration is the same as in the fifth embodiment. The signal interface is incarnated as, for example, part of a system memory SYSM which is packaged in a portable equipment.

Figure 14:
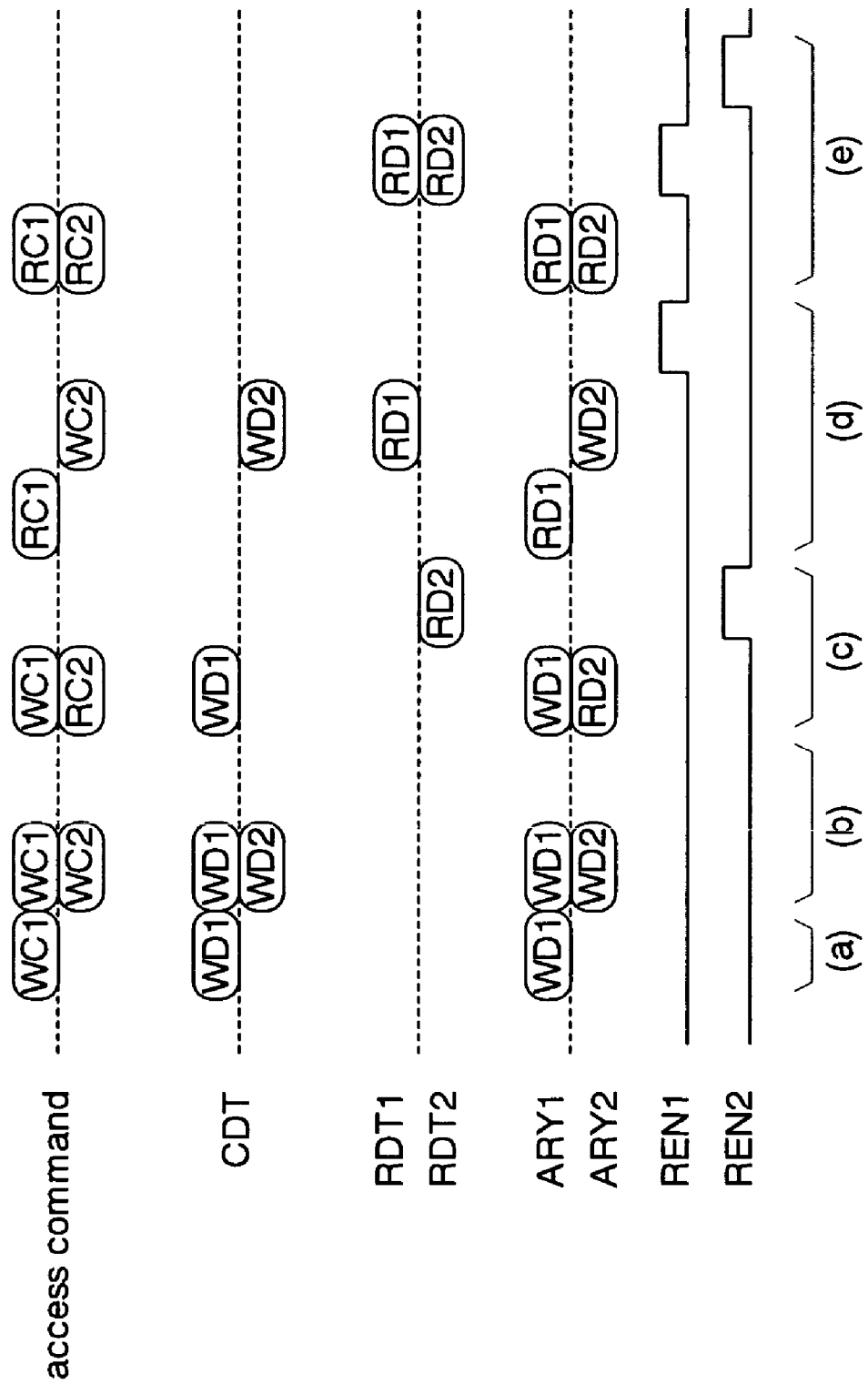
FIG. 14 is a timing chart showing the operation of a signal interface in the sixth embodiment.

FIG. 14 shows the operation of the signal interface in the sixth embodiment. In this embodiment, the read data signal lines RDT1-2 are formed independently of a common data line CDT, so that the read data signal RD1 (or RD2) and write data signals WD1-2 do not conflict. As shown at (d) in FIG. 14, therefore, the read data signal RD1 can be outputted to the controller CNT1 without waiting for the input of the write data WD2. Besides, since the read data lines RDT1-2 are formed independently of each other, the read data signals RD1-2 do not conflict. As shown at (e) in FIG. 14, therefore, the read data signals RD1-2 can be simultaneously outputted.

Also in the sixth embodiment described above, the same advantages as in the first, fourth and fifth embodiments can be attained. Further, the read data signal lines RDT1-2 are formed independently of the common data line CDT, whereby the output timings of the read data signals RD1-2 can be made earlier. As a result, the transfer rate of read data can be enhanced.

Figure 15:
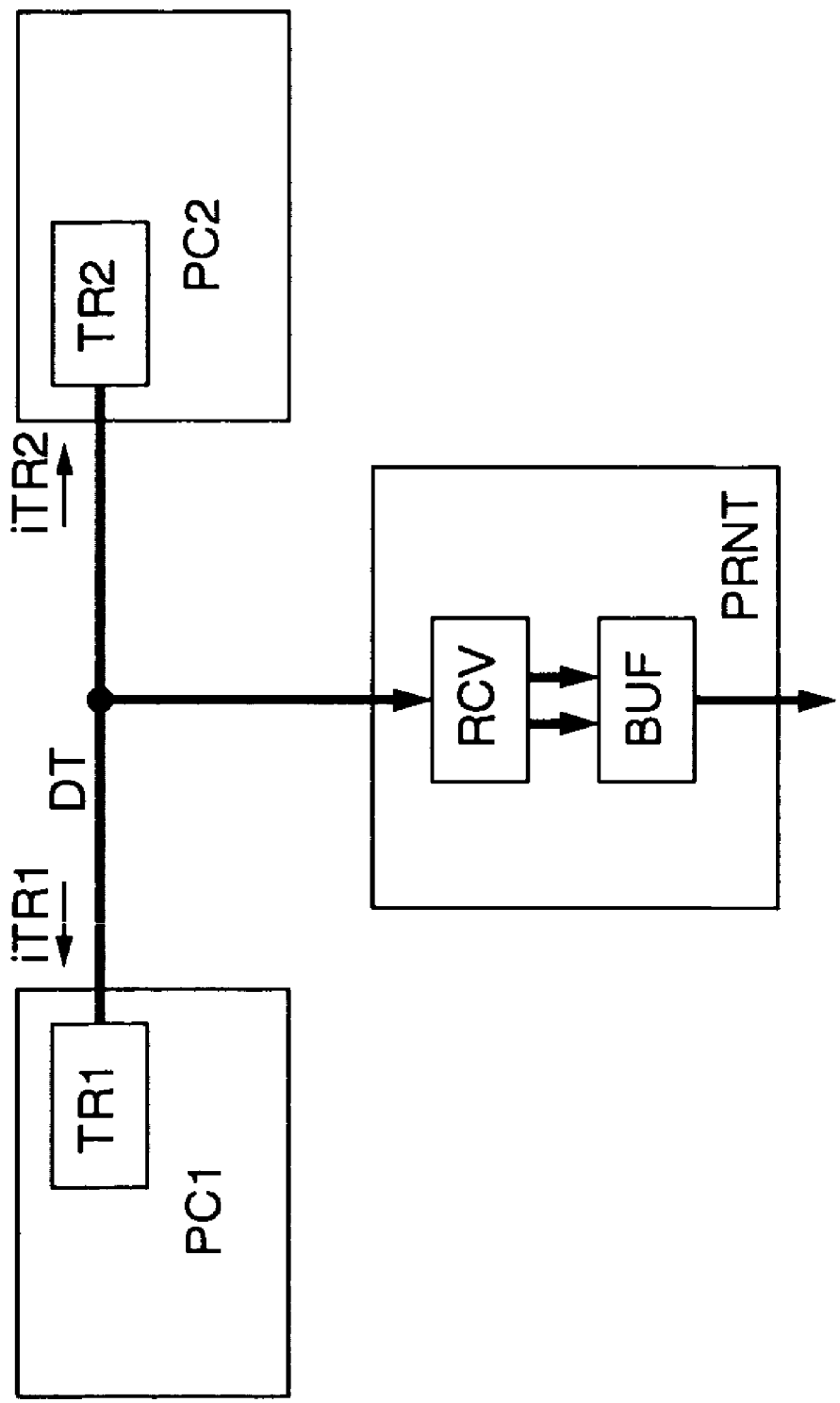
FIG. 15 is a block diagram showing the seventh embodiment of the invention.

FIG. 15 shows the seventh embodiment of the signal interface of the invention. The same constituents as the constituents described in the first embodiment are assigned the same signs, and they shall be omitted from detailed description. In the seventh embodiment, a printer PRNT which is shared by personal computers PC1 and PC2 (hereinafter termed "PC1" and "PC2") is formed by utilizing the signal interface of the invention. Transmitter units TR1-2 and a receiver unit RCV are the same as in the first embodiment.

The transmitter units TR1-2 of the PC1-2 output data signals which are to be outputted to the printer PRNT, to a common data line CDT as currents iTR1-2, respectively. The printer PRNT can simultaneously receive the data signals from the PC1-2. The received data signals are temporarily held in a buffer BUF. The printer PRNT successively outputs the data signals held in the buffer BUF, and performs print operations. Also in the seventh embodiment described above, the same advantages as in the first embodiment can be attained.

Figure 16:
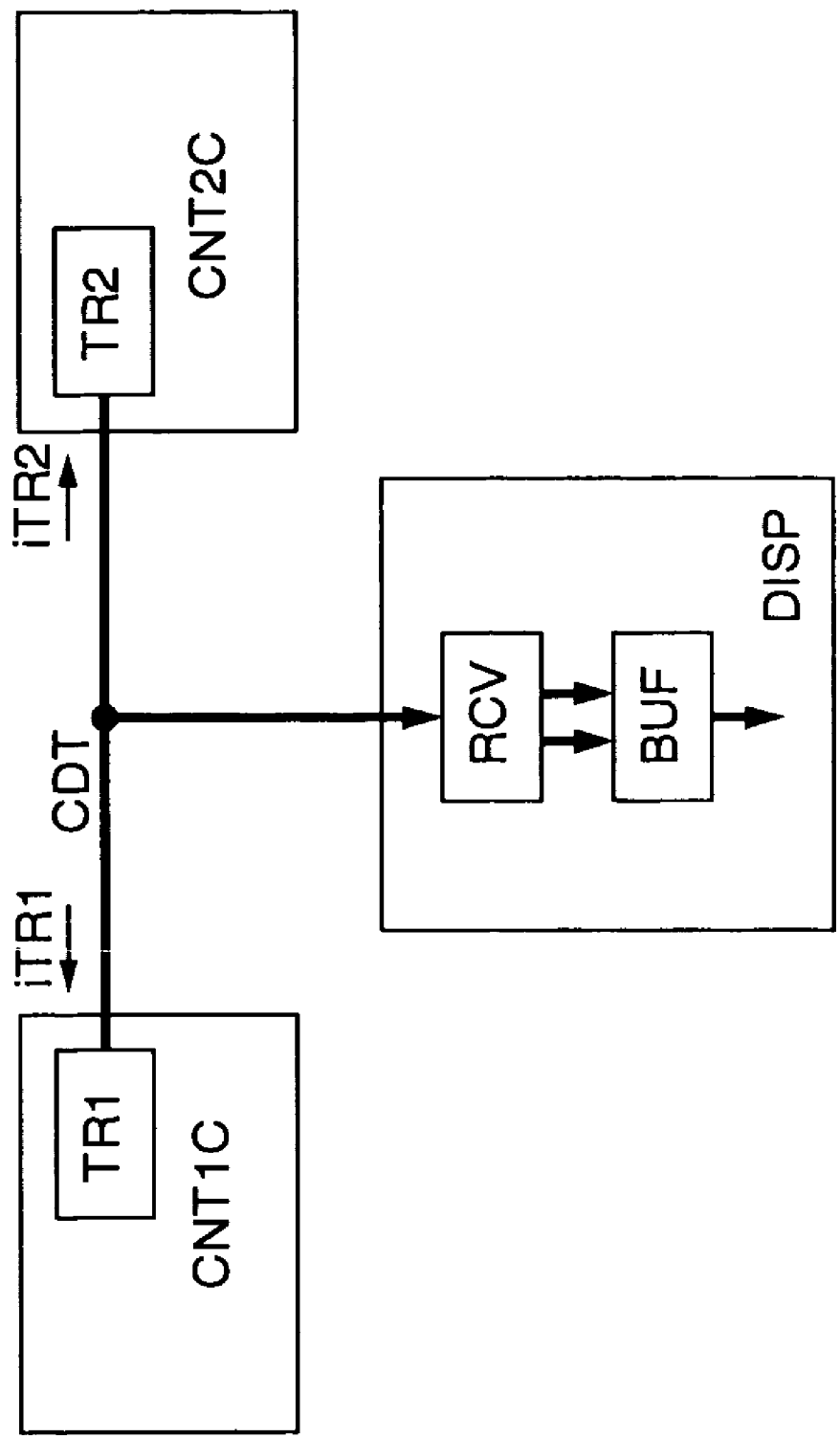
FIG. 16 is a block diagram showing the eighth embodiment of the invention.

FIG. 16 shows the eighth embodiment of the signal interface of the invention. The same constituents as the constituents described in the first embodiment are assigned the same signs, and they shall be omitted from detailed description. In the eighth embodiment, a display system in which data outputted from a plurality of controllers CNT1C and CNT2C are indicated on a display DISP is formed by utilizing the signal interface of the invention. The display system is applied to the screen display of a computer game, a use in which different information items are indicated in a plurality of windows within a screen, or the like. Transmitter units TR1-2 and a receiver unit RCV are the same as in the first embodiment.

The transmitter units TR1-2 of the controllers CNT1C and CNT2C output the data signals which are to be displayed on the display DISP, to a common data line CDT as currents iTR1-2, respectively. The display DISP can simultaneously receive the data signals from the controllers CNT1C and CNT2C. The display DISP holds the received data signals in a buffer BUF, and successively indicates the held data signals. Also in the eighth embodiment described above, the same advantages as in the first embodiment can be attained.

Figure 17:
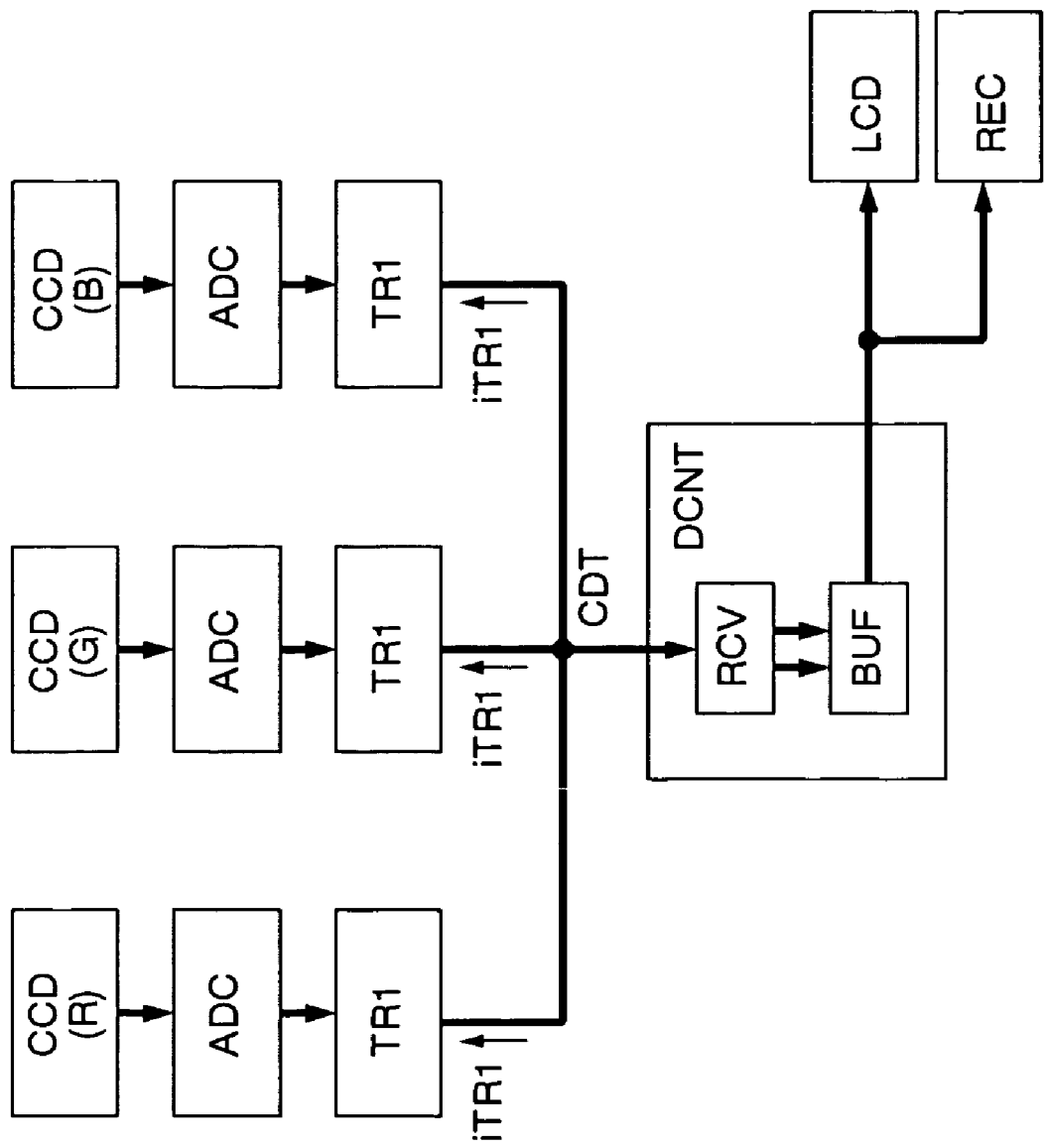
FIG. 17 is a block diagram showing the ninth embodiment of the invention.

FIG. 17 shows the ninth embodiment of the signal interface of the invention. The same constituents as the constituents described in the first embodiment are assigned the same signs, and they shall be omitted from detailed description. In the ninth embodiment, a digital video camera of 3CCD type is formed by utilizing the signal interface of the invention. Transmitter units TR1 and a receiver unit RCV are the same as in the first embodiment.

The digital video camera includes three CCDs; CCD(R), CCD(G) and CCD(B) which receive lights of red, green and blue, respectively. Analog signals photoelectrically converted by the CCDs are respectively converted into digital signals by A/D converters ADCs. The transmitter units TR1 which are respectively connected to the outputs of the A/D converters ADCs in correspondence with the three CCDs, output the converted digital signals to a common data line CDT as currents iTR1, respectively.

A data control circuit DCNT simultaneously receives the currents iTR1 being the digital signals, and it stores the received digital signals in a buffer BUF. The digital signals stored in the buffer BUF are indicated on a liquid-crystal display LCD, and are simultaneously recorded on a record medium REC such as videotape or memory card. Also in the ninth embodiment described above, the same advantages as in the first embodiment can be attained.

Incidentally, in the first-third embodiments, there has been stated the example in which the ROM1-2 and the memory controller MCNT are formed by one chip. However, the ROM1-2 and the memory controller MCNT may well be formed by chips different from one another. In this case, the semiconductor chips are stacked one over another or mounted on a substrate, thereby to configure a multi-chip module.

The correcting function in the second embodiment may well be applied to any of the third-eighth embodiments.

In the fourth-sixth embodiments, there has been stated the example in which the invention is applied to the system including the pseudo SRAM or the SRAM. However, the invention may well be applied to a system including another semiconductor memory such as a DRAM, an SDRAM or a flash memory.

In the ninth embodiment, there has been stated the example in which the invention is applied to the digital video camera of 3CCD type. However, the invention may well be applied to a digital still camera of 3CCD type. Moreover, the camera to which the invention is applied is not restricted to the CCD type, but it may well be of CMOS sensor type.

The invention is not limited to the above embodiments and various modifications may be made without departing from the spirit and scope of the invention. Any improvement may be made in part or all of the components.

What is claimed is:

1. A signal interface comprising:
   a plurality of transmitter units which generate a plurality of currents corresponding to a plurality of logical values, respectively;
   a common signal line which is connected to said transmitter units, and which synthesize the currents generated by said transmitter units, thereby to generate a synthetic current; and
   a receiver unit which is connected to said common signal line, and which restores the logical values generated by said transmitter units, in accordance with the synthetic current, wherein
   values of the currents which said transmitter units generate in correspondence with the logical values are different from one another.

2. The signal interface according to claim 1, wherein:
   said receiver unit includes a receiver correction unit which generates a correction signal that indicate differences between the values of the currents generated by said respective transmitter units in correspondence with known logical values and expected values of currents corresponding to the known logical values and
   said each transmitter unit includes a transmitter correction unit which corrects the current to-be-generated in accordance with the correction signal from said receiver unit, in order to bring the value of the current to-be-generated into agreement with the expected value.

3. The signal interface according to claim 1, wherein said receiver unit includes an arbiter which simultaneously outputs the logical values restored in accordance with said respective transmitter units, to output lines independent of one another.

4. The signal interface according to claim 1, wherein said receiver unit includes an output unit which decides an output sequence of the logical values restored in accordance with said respective transmitter units, and which outputs the logical values to a common output line in the decided sequence.

5. The signal interface according to claim 1, wherein:
   said transmitter units are respectively formed in semiconductor memories, and they generate the currents corresponding to the logical values of data signals read out from memory cells of said semiconductor memories and
   said receiver unit is formed within a controller which controls accesses to said semiconductor memories in order to receive the data signals.

6. The signal interface according to claim 1, wherein:
   said transmitter units are respectively formed within controllers accessing a semiconductor memory, and they generate the currents corresponding to the logical values of access signals accessing said semiconductor memory and
   said receiver unit is formed within said semiconductor memory receiving the access signals.

7. The signal interface according to claim 6, wherein the access signals are address signals designating memory cells of said semiconductor memory.

8. The signal interface according to claim 1, wherein:
   said transmitter units are respectively formed within controllers for accessing a semiconductor memory, and they generate the currents corresponding to the logical values of data signals which are to be written into said semiconductor memory and
   said receiver unit is formed within said semiconductor memory in order to receive the data signals.

* * * * *